US012287491B2

(12) United States Patent
Knüttel

(10) Patent No.: US 12,287,491 B2
(45) Date of Patent: Apr. 29, 2025

(54) HIGH-RESOLUTION HOLOGRAPHIC OPTICAL IMAGING DEVICE

(71) Applicant: AKMIRA OPTRONICS GMBH, Potsdam (DE)

(72) Inventor: Alexander Knüttel, Potsdam (DE)

(73) Assignee: AKMIRA OPTRONICS GMBH, Potsdam (DE)

(*) Notice: Subject to any disclaimer, the term of this patent is extended or adjusted under 35 U.S.C. 154(b) by 93 days.

(21) Appl. No.: 18/189,243

(22) Filed: Mar. 24, 2023

(65) Prior Publication Data

US 2024/0319514 A1   Sep. 26, 2024

(51) Int. Cl.
| G02B 27/10 | (2006.01) |
| G02B 5/04 | (2006.01) |
| G02B 5/136 | (2006.01) |
| G02B 27/42 | (2006.01) |
| G03H 1/02 | (2006.01) |
| H04N 23/56 | (2023.01) |

(52) U.S. Cl.
CPC ..... G02B 27/1086 (2013.01); G02B 27/1066 (2013.01); G02B 27/4205 (2013.01); G03H 1/0248 (2013.01); H04N 23/56 (2023.01); G02B 5/045 (2013.01); G02B 5/136 (2013.01)

(58) Field of Classification Search
CPC ............ G02B 27/1086; G02B 27/1066; G02B 27/4205; G02B 5/045; G02B 5/136; G03H 1/0248; H04N 23/56
USPC ........................................................ 348/337
See application file for complete search history.

(56) References Cited

U.S. PATENT DOCUMENTS

| 6,084,673 A | 7/2000 | Van Den Brink et al. |
| 2003/0169429 A1 | 9/2003 | Hill |
| 2014/0177782 A1* | 6/2014 | Herold .................... A61B 6/032 378/4 |
| 2016/0305761 A1 | 10/2016 | Girshovitz et al. |
| 2021/0063137 A1* | 3/2021 | Gao .................... H01S 3/10053 |

* cited by examiner

Primary Examiner — Usman A Khan
(74) Attorney, Agent, or Firm — JMB Davis Ben-David

(57) ABSTRACT

The invention relates to an optical imaging device. The device comprises at least one beam splitter element onto which object light emanating from an examination object is incident via an input aperture of the device and at which the object light is split into a first light component and into second light components which comprise a respective wavefront, a detection unit which is arranged behind the at least one beam splitter element in the direction of propagation of the object light, and an evaluation unit coupled to the detection unit, wherein the device is configured in a wavefront-inverting manner for inverting the wavefront of the first light component and/or the wavefront of the second light component wherein the first light component and the second light component are incident on the detection unit via at least one optical element, wherein the wavefronts of the first light component and of the second light component interfere at the detection unit depending on an inclination angle between the wavefronts to form a respective interference pattern, which inclination angle is characteristic of an angle which the object light comprises on the incidence side with respect to a defined direction of arrival on the at least one beam splitter element, and wherein the evaluation unit generates an image of the examination object based on the interference pattern.

15 Claims, 8 Drawing Sheets

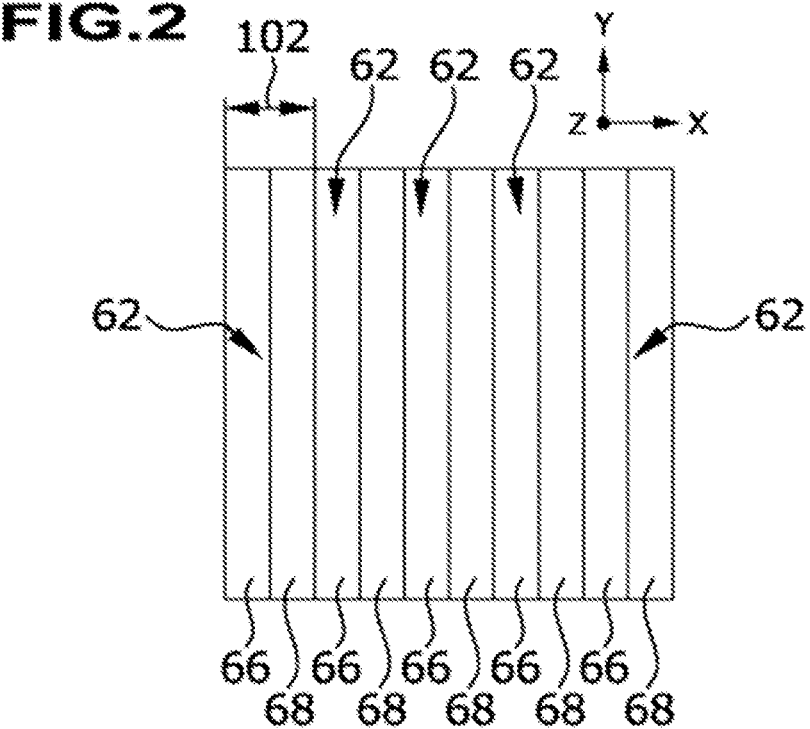
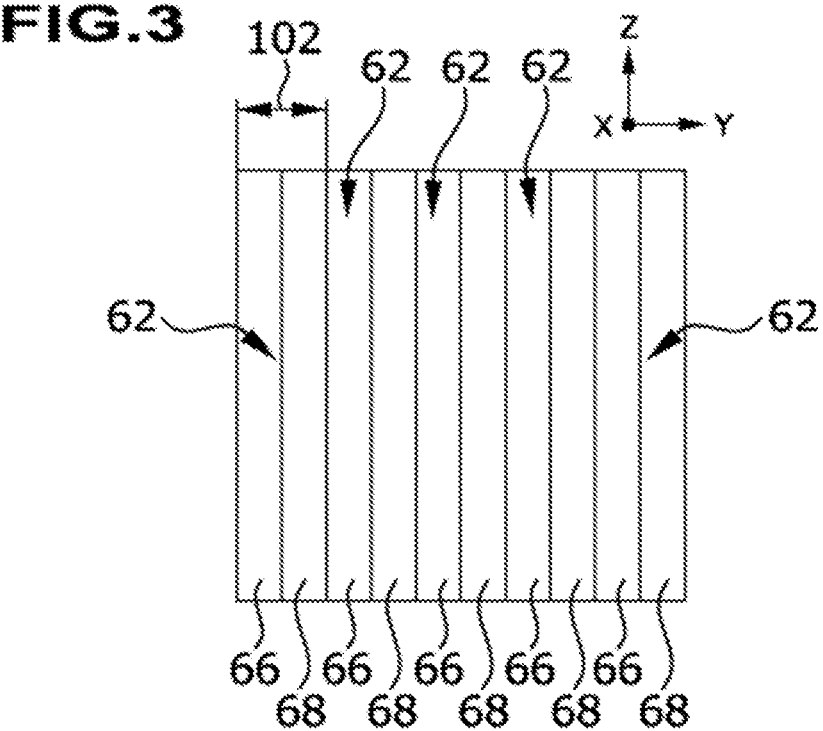

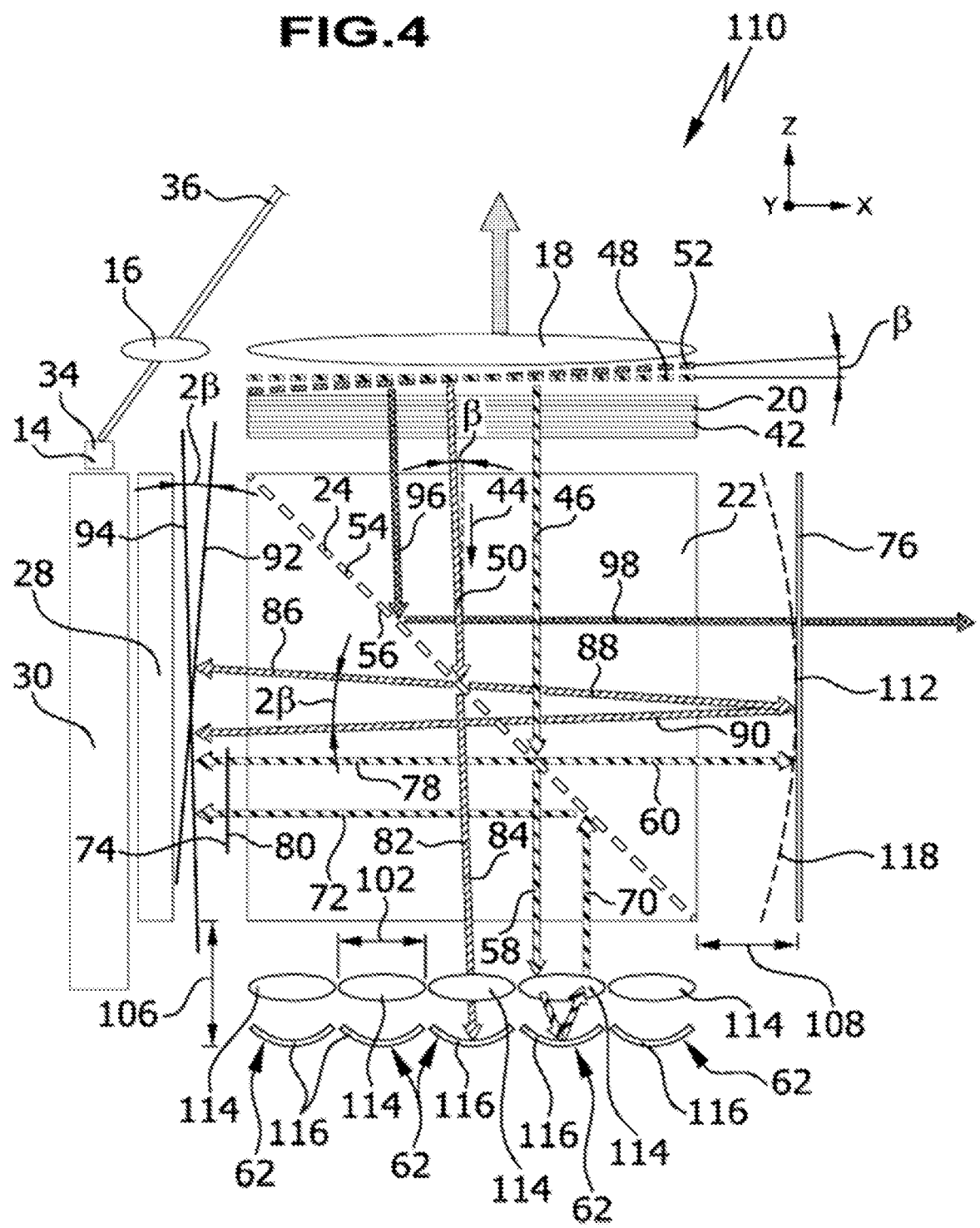

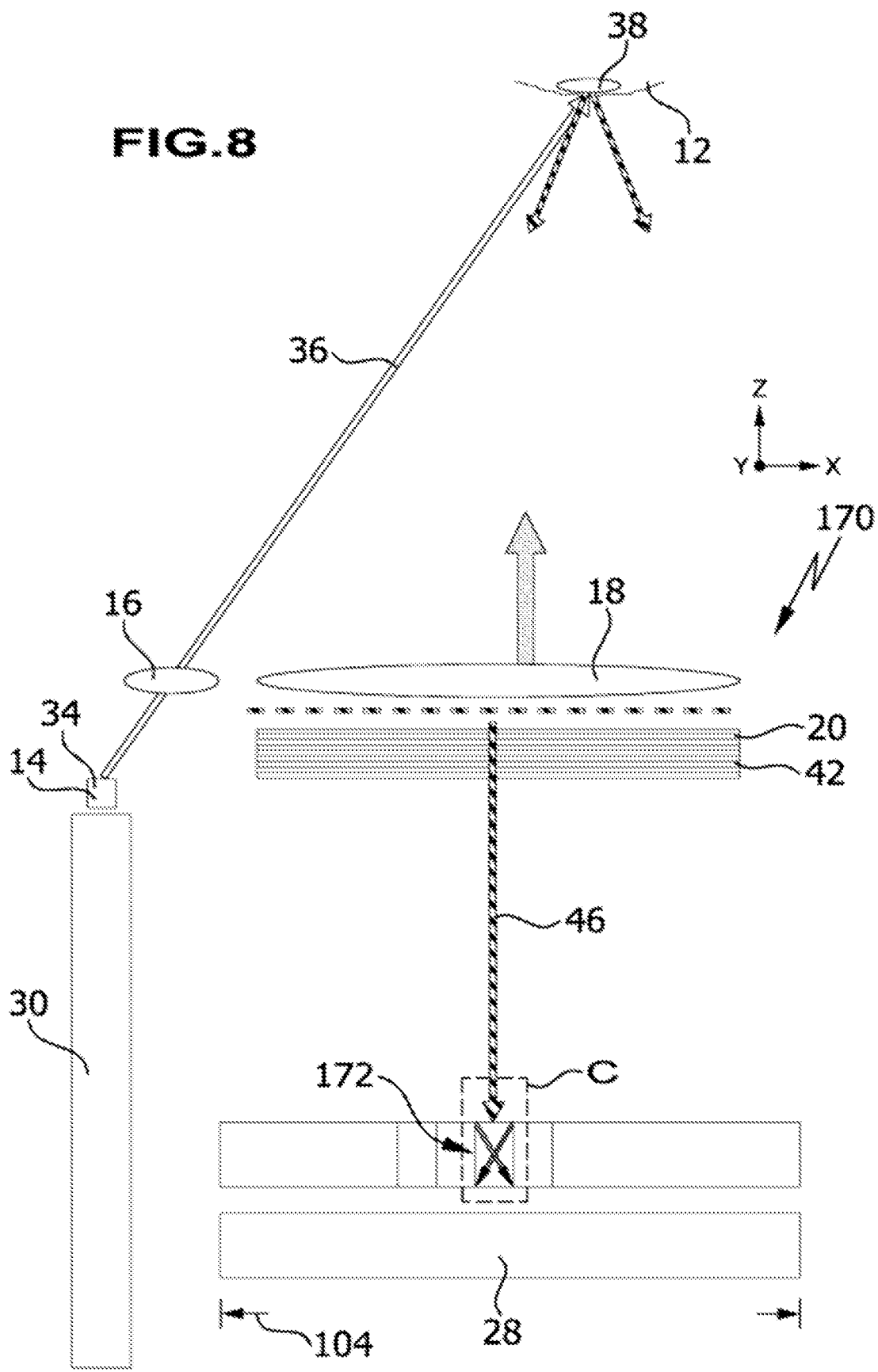

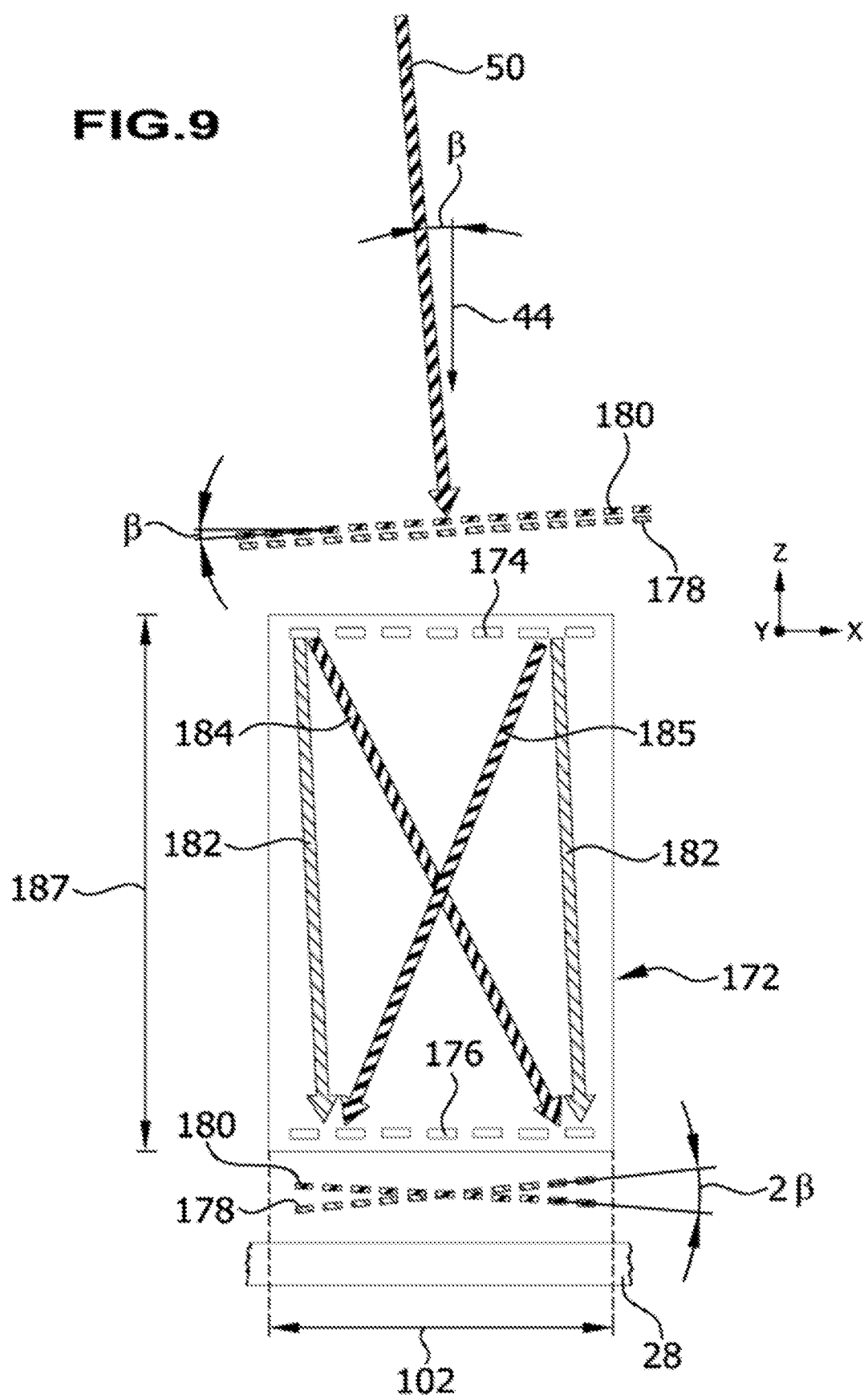

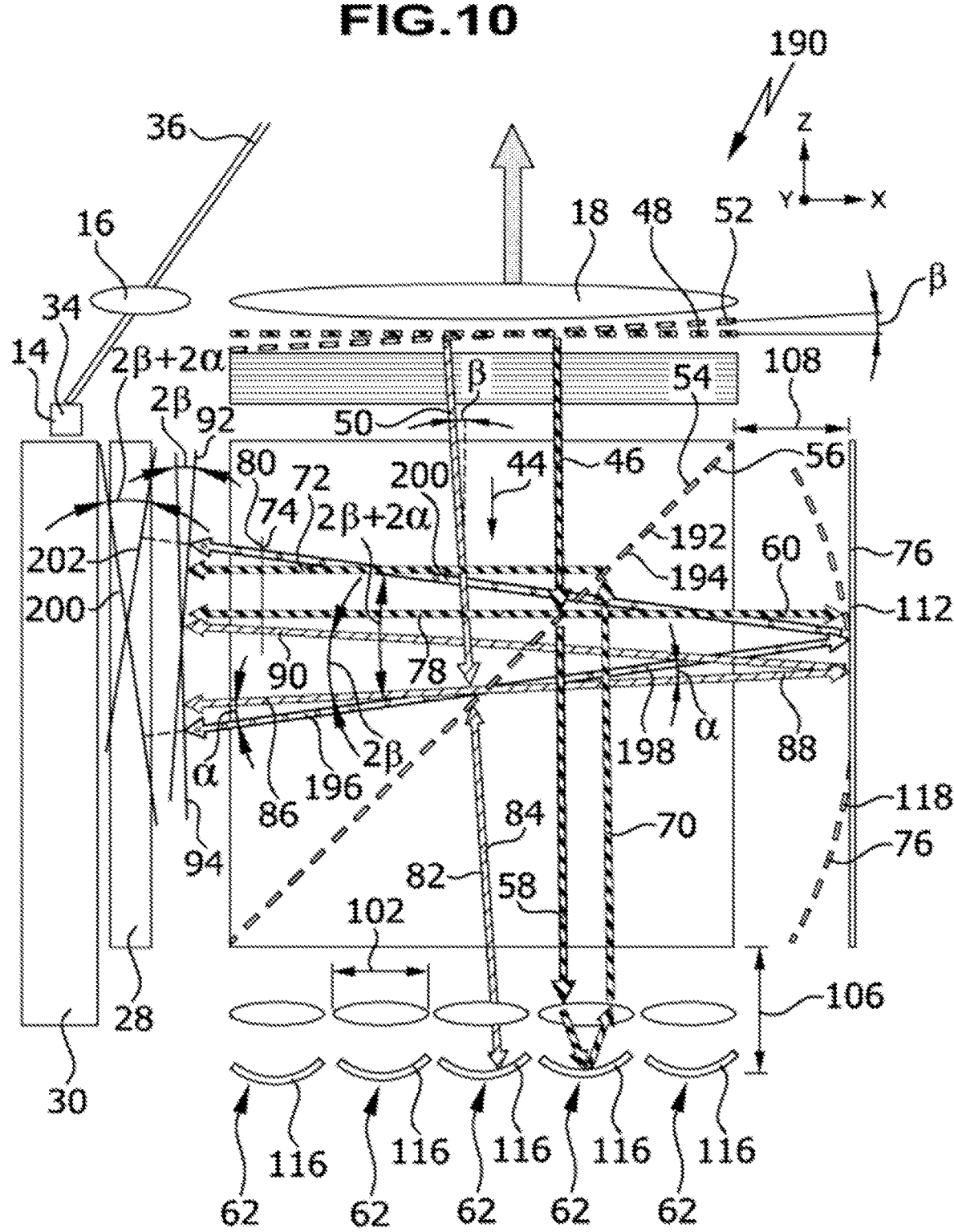

HIGH-RESOLUTION HOLOGRAPHIC OPTICAL IMAGING DEVICE

FIELD

The present invention relates to an optical imaging device for examination of an examination object.

BACKGROUND

The present invention relates to an optical imaging device for examination of an examination object. Herein, object light incident from the examination object onto an input aperture of the device may be based on an excitation process upon illuminating the examination object with excitation light, for example, a laser light source having at least one predetermined wavelength. The device can be used, for example, in absorption spectroscopy, fluorescence spectroscopy, and/or Raman spectroscopy. Alternatively or additionally, the object light may be, for example, illumination light reflected from the examination object. The application with self-luminous examination objects is also conceivable. Exemplary applications can be found in investigations with delimitated large spot or scatter spot. For example, an application in the region of material processing is conceivable, for example in welding processes with typical spot sizes of approximately 1 mm to 5 mm diameter and above.

A system for sample inspection and quantitative image processing and a method for off-axis interferometry is described in US 2016/0305761 A1. Enabled is the recording of off-axis holograms in an extended field of view (FOV).

U.S. Pat. No. 6,084,673 A describes a lithographic projection apparatus for step and scan imaging of a mask pattern on a substrate.

US 2003/0169429 A1 describes an interferometric system comprising a multi-pass interferometer and reflectors that reflect at least two beams during multiple passes through the interferometer.

SUMMARY

It is object of the present invention to provide an optical imaging device with a compact design and high spatial resolution.

This objective is solved according to the invention by an optical imaging device comprising at least one beam splitter element onto which object light emanating from an examination object is incident via an input aperture of the device and at which the object light is split into a first light component and into a second light component which comprise a respective wavefront, a detection unit which is arranged downstream of the at least one beam splitter element in the direction of propagation of the object light, and an evaluation unit which is coupled to the detection unit, wherein the device is configured in a wavefront-inverting manner for inverting the wavefront of the first light component and/or the wavefront of the second light component wherein the first light component and the second light component are incident on the detection unit via at least one optical element, wherein the wavefronts of the first light component and of the second light component interfere at the detection unit depending on an inclination angle between the wavefronts to form a respective interference pattern, which inclination angle characterizes an angle which the object light comprises on the incidence side with respect to a defined direction of incidence on the at least one beam splitter element, and wherein the evaluation unit generates an image of the examination object based on the interference pattern.

In the device according to the invention, a defined direction of arrival for object light from the examination object is defined, for example, by an optical axis of an imaging element arranged at the input aperture. This can be, for example, a collecting lens in the focus of which an extended scatter spot is located on the examination object. Portions of object light in the region of the geometric focus can be incident on the beam splitter element as plane waves, for example. Portions of object light originating from the scatter spot and located outside the geometric focus in the focal plane may be incident as, for example, plane waves at an angle with respect to the defined direction of arrival. This angle is accordingly a measure of the segment of the examination object in the focal plane from which the relevant portion of the object light originates. For object light originating from outside the focal plane, the wavefronts may be curved (for example, spherically curved). If the depth is known, the evaluation unit can preferably compensate for this curvature by calculation and assign signal contributions to the planes of the examination object.

Incident object light is split into two light components at the at least one beam splitter element in the device according to the invention. The wavefront of the light of at least one light component is inverted by the device. Here, a wavefront inversion can take place in such a way that the wavefront is inverted with respect to the wavefront of the respective other light component in front of the detection unit in a spatial direction. An inversion of the wavefronts of both light components is conceivable in such a way that the inversions take place in spatial directions different from each other. The wavefront inversion in at least one light component can be achieved via a compact design of the device. The wavefronts fall on the detection element via the at least one optical element and can interfere as a result of the at least one inversion in at least one spatial direction to form an interference pattern. In particular, the interference pattern depends on an angle of inclination between the wavefronts, which is indicative of the angle at which the portion of the object light is relative to the defined direction of incidence. Based on this information, the evaluation unit can create an image of the examination object based on the interference pattern at least in the region of the scatter spot, since the angle correlates with the lateral distance relative to the optical axis.

Depending on the application, the scatter spot can vary in size. Typically, the diameter may be from about 1 mm to 5 mm. However, particularly with "full area" illumination, the diameter may be, for example, about 10 mm or more, wherein about 100 mm is also conceivable.

Spatial examination of the examination object can take place, for example, by means of spatial scanning through relative movement of the device and the examination object. Preferably, the device is moved relative to the stationary examination object.

The interference pattern is, for example, a fringe pattern, which may comprise multiple fringe densities ("fringe frequencies"). For example, the detection unit comprises an array of detection elements for detecting the interference pattern. For example, the evaluation unit determines the angle with respect to the defined direction of arrival by Fourier transforming the interference pattern. During the evaluation interference techniques known to the skilled person may optionally be preferred to Fourier transform methods.

With the device, according to what has been said, the location information about the examination object can be determined. Preferably, as will be further discussed hereinafter, spectroscopic imaging may be performed in which spectral information in the object light is considered in addition to the location information. The spectral information can be based, for example, on an illumination wavelength, an excitation wavelength, and/or a fluorescence wavelength.

The inclination angle between the wavefronts of the first light component and the second light component is particularly larger, the larger the angle of the direction of arrival of the object light is in relation to the defined direction of arrival. Due to the different interference pattern depending on the inclination angle, it is possible for the evaluation unit to determine the local origin of the relevant portion of the object light from the examination object.

The device can be configured such that the inclination angle between the wavefronts disappears when the object light is incident along the defined direction of arrival.

In particular, the inclination angle between the wavefronts of the first light component and the second light component is twice as large as the angle that the direction of arrival of the object light adopts with respect to the defined direction of arrival. In this way, a high spatial resolution can be achieved with the device.

Advantageously, the object light is split at the at least one beam splitter element 50% or essentially 50% respectively into the first light component and the second light component. If the object light is divided into the first and the second light component by half respectively, an interference pattern with high contrast can be generated during self-interference.

It is advantageous if the device comprises or forms at least one sub-aperture, wherein the at least one sub-aperture is configured to invert a respective wavefront of the first light component and/or the wavefront of the second light component. Via the respective sub-aperture, path length differences between the first light component and the second light component that are as small as possible can be achieved. Within the respective sub-aperture, an interference pattern with preferably extended lateral visibility can be generated in this way.

The totality of sub-apertures corresponds, for example, to a detection aperture of the detection unit; alternatively, it may be different from the detection aperture.

Sub-apertures are provided or formed, for example, at least along a first spatial direction of the device. Sub-apertures may be provided or formed, for example, along a second spatial direction of the device oriented transversely and particularly perpendicular to the first spatial direction.

Sub-apertures may be provided or formed along the light path of the first light component and/or along the light path of the second light component.

It can be provided that sub-apertures are provided or formed along at least one spatial direction in the light path of the respective light component.

Sub-apertures along the light path of the first light component and the second light component are particularly provided or formed in two different spatial directions (particularly 2D sub-apertures). It may be provided that sub-apertures are provided or formed in two spatial directions in the light path of one of the two light components, wherein in this case the light path of the respective other light component may be free of sub-apertures.

Each sub-aperture conveniently contains the information about the angle of the object light with respect to the defined direction of arrival. Accordingly, depending on each sub-aperture, an independent and evaluable interference pattern can be provided. This results in an advantage of a high signal strength over the entire aperture formed by the sub-apertures, if it is assumed that the signal originating from a sub-aperture drops off at its edge.

Conveniently, the contributions from the individual sub-apertures can be added up to obtain the overall signal. The overall signal preferably comprises a good signal-to-noise ratio (SNR, signal-to-noise ratio). "Contribution" is in particular an image based on a respective sub-aperture.

Alternatively or additionally, amplitude and phase information can be considered within a respective sub-aperture to provide a high resolution image. This image preferably has the same optical resolution as if it had been acquired with a large aperture. For this purpose, for example, phase offsets in the corresponding pixels (of the detection unit) of a respective sub-aperture can be calculated for these to individually resolved pixels from an extrapolated total aperture.

In a constructively simple embodiment and compact construction of the device, it is provided that the at least one beam splitter element forms the at least one optical element. In particular, for example, a beam splitter cube can be provided, the beam splitter layer of which comprises or forms the at least one beam splitter element and the at least one optical element. Object light is incident, for example, on a first side of the beam splitter layer and, after respective reflection, is guided via a second side of the beam splitter layer in the direction of the detection unit. Alternatively, for example, a beam splitter plate forming the at least one beam splitter element and the at least one optical element may be provided.

In a preferred embodiment of the invention, the at least one beam splitter element may be or comprise a diffraction element, wherein the first light component is transmitted by the diffraction element, after reflection is reflected at a reflection element, and is diffracted at the diffraction element in a wavelength-dependent manner in the direction of the detection unit and wherein the second light component is diffracted at the diffraction element in a wavelength-dependent manner in the direction of a reflection element, is reflected therefrom in the direction of the detection unit and is transmitted by the diffraction element. Here, the beam splitter element also forms the optical element, in the form of the diffraction element.

The diffraction element is, for example, a spectral grating, in particular a VPH (Volumetric Phase Hologram).

In the preferred embodiment mentioned in the previous paragraph, it is possible to evaluate spectral information within the object light in addition to the spatial information used to create the image. Each of the two light components is transmitted once at the diffraction element and diffracted once, wherein the diffraction is wavelength-dependent. At the detection unit, the wavefronts of the two light components thus overlap in a wavelength-dependent manner. Depending on the wavelength, the wavefronts can be tilted relative to each other by a tilt angle that is characteristic of the wavelength.

According to what has been said, it can be advantageous if the device is a spectroscopic imaging device and if at least one element spectrally decomposing the object light is comprised, in particular the diffraction element mentioned above, wherein a respective interference pattern at a given inclination angle of the wavefronts is dependent on a wavelength of the object light. For example, the fringe frequency in the interference pattern ("fringe frequency") is dependent on the wavelength in such a way that a higher fringe frequency occurs at smaller wavelengths than at larger wavelengths. The analysis of the interference pattern allows the evaluation unit to generate a spectrum of the object light at a given inclination angle, and thus place of origin of the object light. Preferably, the evaluation unit can create a spectrally dependent image of the examination object based on the respective interference pattern.

It is advantageous if spectral information determined by the evaluation unit is used to create one and/or more color images of the examination object. For example, said spectrally dependent image can be a spatially resolved image of the examination object with color information.

Due to the dispersion of the diffraction element, the tilt angle between the wavefronts of the two diffracted light components in the preceding embodiment example is dependent on the wavelength of the object light and is greater the greater the deviation of the wavelength from a given wavelength. In the case of self-interference of the object light, this angle is characteristic for the wavelength and results from the wavelength-dependent diffraction angle at the diffraction element.

In particular, the tilt angle between the wavefronts can disappear if light of a predetermined wavelength is incident on the diffraction element and the Bragg condition is exactly fulfilled. If the Bragg condition is fulfilled, the tilt angle is independent of the angle of the object light on the incident side with respect to the predetermined direction of arrival and thus independent of the region of the examination object from which the object light originates.

The tilt angle between the wavefronts of the first and second light components is in particular twice as large as an angle between the direction of diffraction to the first order for the first or second light component at the given wavelength and the direction of diffraction to the first order for the wavelength deviating from it. Due to the double passage of object light through the diffraction element, the double angle due to dispersion results from the fact that both the first light component and the second light component are diffracted. In the direction of propagation of the object light, the two light components are diffracted in a direction pointing away from the respective other light component and thus comprise the double angle between them by which each light component is diffracted at the diffraction element with respect to the predetermined wavelength.

The diffraction element is preferably formed such that 50% or approximately 50% of the object light is transmitted as a first light component or diffracted as a second light component, respectively, with respect to a predetermined wavelength.

The diffraction element is preferably positioned in Littrow arrangement relative to the defined direction of arrival with respect to the predetermined wavelength at which an incident angle of the object light on the diffraction element corresponds to a first order diffraction angle of the second light component. For example, incident light in the defined direction of arrival is incident on the diffraction element at a Littrow angle of 45°, wherein the direction of diffraction into the first order comprises an angle with the direction of arrival of 90° under a satisfied Bragg condition. The first and second light components may be oriented at an angle of 90° to each other.

In the context of the diffraction element, reflection elements along the light paths of the first and second light components have already been discussed. Advantous designs of the reflection elements are explained below.

It may be advantageous if the device comprises, associated with the first light component, at least one first reflection element at which the first light component is reflected in the direction of the at least one optical element, and/or at least one second reflection element at which the second light component is reflected in the direction of the at least one optical element. Such an embodiment proves advantageous, for example, for a compact structure in combination with the preceding beam splitter cube or beam splitter plate.

It can be provided, for example, that the first light component is transmitted by the at least one beam splitter element and, after reflection at the at least one first reflection element, is reflected at the at least one optical element, and that the second light component is reflected at the at least one beam splitter element and, after reflection at the at least one second reflection element, is transmitted by the at least one optical element. In combination with the beam splitter cube or the beam splitter plate, this results in particular in a double passage of the respective light component-once transmission and once reflection-combined with an increased spatial resolution. The resolution is, for example, twice as large or essentially twice as large as with only single transmission and is based in particular on the wavefront inversion along the light path of at least one light component.

It may be desirable to keep the path differences between the first light component and the second light component from the at least one beam splitter element to the respective reflection element and to the at least one optical element small. Both light components can comprise a light path of equal length in this case.

On the other hand, it can be provided that light paths of different lengths are used in a targeted manner, wherein the first light component and the second light component pass through light paths of different lengths from the at least one beam splitter element to the respective reflection element and to the at least one optical element.

For example, in the latter embodiment, the device is configured to successively emit light with two different illumination or excitation wavelengths via an illumination unit, wherein a phase difference between the interference patterns occurring in each case can be achieved as a result of the different lengths of the light paths. The phase difference is preferably 180° (Pi) and causes a shift of the fringes by half a wave.

Advantageously, the evaluation unit can be configured to subtract images resulting from the phase-shifted interference patterns from each other. This allows, for example, background signal contributions—generally particularly incoherent and/or broadband background signal contributions—to be reduced and ideally eliminated. At the same time, the useful signal can be increased, wherein in the best case even a doubling is conceivable.

It can be provided that object light incident in the defined direction of arrival is incident on the at least one beam splitter element at an angle of 45° or essentially 45°. Here, the second or first light component may be deflected by 90° or essentially 90° with respect to the direction of arrival and reflected into itself at the at least one second reflection element. For example, the first light component is transmitted by the at least one beam splitter element and reflected into itself at the at least one first reflection element. At the at least one optical element, the first light component may be reflected such that it comprises an angle of 90° or essentially 90° with respect to the defined direction of arrival.

It is advantageous if a plurality of reflection elements (first and/or second reflection elements) are provided, which are arranged laterally next to each other and which respectively form a sub-aperture for the first light component or the second light component. The reflection elements are preferably identically configured. It may be provided that the first reflection elements are identically configured to the second reflection elements. For example, the first and/or second reflection elements are arranged side by side. An array of first and/or second reflection elements can be provided.

In a preferred embodiment of the invention, the at least one first reflection element and/or the at least one second reflection element comprises or forms a retroreflector element.

The at least one first and/or second reflection element, in particular the retroreflector element, comprises for example a preferably spherical lens and a mirror, for example a concave mirror. For example, a plurality of lenses and concave mirrors associated therewith are provided, wherein these respectively form at least one sub-aperture along the light path of the first light component and/or second light component. An array arrangement of lenses and concave mirrors associated therewith is conceivable. The lenses can be microlenses, for example.

For example, an array of microlenses with a given center thickness can be applied, wherein the rear lens surface with respect to the direction of arrival is mirrored to form the mirror and thus acts like the above-mentioned concave mirror. The monolithic structure of lens and mirror is advantageous here.

The retroreflector elements are used, for example, to define sub-apertures in two spatial directions in the light path of the first or second light component.

In a preferred embodiment of the invention, the at least one first and/or second reflection element can comprise, for example, two sides aligned at an angle, in particular 90° or essentially 90°, to one another. A respective side may be formed to reflect object light, respectively. For example, object light is incident on a first of the two sides, is reflected toward the second side, and is reflected therefrom toward the at least one optical element. The at least one reflection element can be formed in cross-section, for example, isosceles-rectangular, with an angle of 90° between the sides.

The at least one reflection element of the preceding embodiment is or comprises, for example, an inverted prism, in particular a roof prism. In this case, the reflecting sides are arranged, for example, at the cathedrals. The hypotenuse faces the at least one optical element in particular.

Along the light path of the first light component and along the light path of the second light component, at least one reflection element is preferably provided, wherein the reflection elements are extended along respective spatial directions that are aligned at an angle to each other. The angle may in particular be 90° or essentially 90°. Along the light paths of the first and second light components, the reflection elements are arranged, for example, rotated at an angle to one another. In this way, sub-apertures can be formed in different spatial directions in a respective light path.

At the detection unit, sub-apertures in the above case can be aligned in two directions, for example, due to the angle between the reflection elements in the respective light paths. This gives, for example, the possibility of a checkerboard interference pattern where fringes occur in two directions during self-interference.

For instance, in preceding advantageous embodiment, the reflection elements are inverted prisms, particularly roof prisms.

It can be provided that the at least one reflection element in the light path of one light component is a plane mirror or a concave mirror. Here, in particular along the light path of the other light component, a wavefront inversion takes place in two spatial directions.

The concave mirror in the light path of one light component can, for example, be combined with sub-apertures of the types previously described along the light path of the other light component. This offers the possibility that sub-aperture-dependent different phase fronts of the object light exist in front of the detection unit depending on which region of the concave mirror is illuminated.

If a plane mirror is used, phase fronts of light of the respective light component comprise comparable amounts. Irrespective of any wavelength-dependent aberrations, identical interference patterns are generated in front of the detection unit, except for offset phases, as long as the examination object is located in focus. Optionally, wavelength-dependent aberrations can be exploited by the evaluation unit for the evaluation, if required.

The application of a concave mirror can prove advantageous for specifically varying phase fronts and/or reflection angles of the respective light component, depending on the point of incidence on the concave mirror, and thereby influencing the light path relative to the other light component. This offers, for example, the possibility of separating object light with different wavelengths in a spectral imaging device, for example based on several simultaneously irradiated wavelength ranges. Thus, spatial contributions of object light based on the origin from the examination object on the one hand and spectral contributions of object light on the other hand can be separated from each other by the evaluation unit. The distinction can be made by the fact that the light paths between the light components within different sub-apertures differ from each other due to the different phase fronts and/or reflection angles. The inclination angle between the wavefronts resulting from the different origin of object light from the examination object and the tilt angle between wavefronts due to the spectral decomposition can thus be separated mathematically by the evaluation unit.

As mentioned above, the device is preferably configured for spectroscopic examination of the examination object and accordingly preferably forms a spectroscopic imaging device.

The at least one reflection element with the two sides aligned at an angle to one another is preferably arranged in such a way that the sides in the direction of arrival of the object light comprise a diffraction element, respectively, wherein incident object light is diffracted at the respective diffraction element in a wavelength-dependent manner, wherein in particular object light of a predetermined wavelength is reflected back in parallel. The arrangement with the diffraction elements therefore "acts" as a reflection element for the predetermined wavelength. At this wavelength, for example, the Bragg condition is fulfilled at each diffraction element, so that a 90° deflection takes place at the respective diffraction element and thus a total 180° deflection. For a wavelength deviating from the specified wavelength, a back radiation of the light component with angular offset with respect to the Direction of arrival occurs as a result of diffraction.

The object light of the specified wavelength is preferably reflected in parallel with respect to the defined direction of arrival, independent of the angle of the direction of arrival. If the wavelength differs, as will be discussed below, diffraction at the respective diffraction element results in different angles for the incident object light, which can be used for spectroscopic evaluation.

For example, an inverted prism and particularly a roof prism is provided for implementation in spectroscopic evaluation, which is oriented so that its "edge" faces the incident object light. The sides of the reflection element with diffractive elements are arranged, for example, on the cathetes emanating from the edge. The hypotenuse faces away from the direction of arrival of the object light.

Object light of a wavelength deviating from the predetermined wavelength is incident on the detection unit, in particular after diffraction at both diffraction elements with a first wavefront and a second wavefront, wherein the wavefronts are tilted relative to each other by a tilt angle and interfere to form a respective interference pattern, wherein the evaluation unit determines the deviating wavelength based thereon. The tilt angle between the wavefronts depends on the wavelength difference between the predetermined wavelength and the wavelength deviating from it. In a preferred embodiment of the device in which roof prisms with two diffraction elements are used, the tilt angle can be four times as large as an angle between the diffraction direction at the given wavelength to the first order and the diffraction direction to the first order for the wavelength deviating from it at only one of the diffraction elements. Thus, in a preferred embodiment, a spectral resolution can be obtained via the device that is favorably four times as large or essentially four times as large as when, for example, object light is diffracted by only one diffraction element.

The respective diffraction element is, for example, a phase grating, in particular a VPH.

Diffraction of the object light of the predetermined wavelength at the diffraction element preferably takes place essentially to the first order.

It is understood that the at least one diffraction element reflection element may be provided in the light path of the first light component, and in the light path of the second light component.

Object light outside a predetermined spectral range can preferably be decoupled from the device, particularly via the at least one reflection element.

In a preferred embodiment, the device can comprise at least one wavefront inversion unit which is arranged upstream of the detection unit and which comprises, on the input side, at least one beam splitter element and, on the output side, at least one optical element which are diffractive and have a common focus with respect to the direction of arrival of the object light, wherein, at the at least one beam splitter element and at the at least one optical element, the first light component of the object light is transmitted undeflected and the second light component of the object light is diffracted.

The wavefront of the first light component passes the at least one beam splitter element and the at least one optical element undeflected. In contrast, the wavefront of the second light component is inverted by diffraction at the at least one beam splitter element and re-diffraction at the at least one optical element. The wavefront inversion units are arranged and configured such that the wavefronts of the first and second light components comprise an inclination angle to each other when incident object light is oriented at an angle to the defined direction of arrival.

In the wavefront inversion unit, the at least one beam splitter element and the at least one optical element are configured, for example, as phase gratings, for example VPHs or GPHs (Geometric Phase Holograms).

Preferably, a plurality of wavefront inversion units is provided which form a respective sub-aperture and are positioned respectively upstream of a segment of the detection unit. The wavefront inversion units are preferably formed identically and positioned, for example, laterally next to each other in front of the detection unit.

Preferably, the device comprises an illumination unit comprising at least one light source for illuminating the examination object. The illumination may be broadband and/or narrowband. For example, light having a linewidth of less than or equal to about 1 nm may be considered narrowband. The light emitted by the light source may be, for example, illumination light or excitation light.

The device is preferably configured to produce spectrally different images of the examination object depending on two or more spectral ranges of an illumination light and/or object light.

For example, illumination light of different wavelengths can be emitted successively in time by means of the illumination unit, wherein the evaluation unit is synchronized with the illumination unit in order to create an image of the examination object depending on the emission of light of different wavelengths, respectively. For example, it is provided that a plurality of images are created under illumination light of different wavelengths, wherein the images can be superimposed by the evaluation unit. For example, narrow-band illumination via the illumination unit may be sufficient for this purpose. For example, spatially resolved color images of the examination object with two or more color channels are superimposed.

Different wavelengths can be particularly different spectral ranges. These ranges can overlap each other spectrally or be spectrally separated from each other.

For example, the illumination unit can simultaneously emit illumination light in different wavelength ranges that do not overlap or overlap only insignificantly. The different spectral portions of the object light can, for example, be separated from the spatial portions of the object light by using a curved reflection surface of a concave mirror as explained above.

It can be provided that the device comprises mutually different filter elements with a respective spectral signature, which are arranged in light paths of the first light component and/or the second light component, wherein the evaluation unit is configured to generate images of the examination object depending on the spectral signature of the filter elements. Bandpass filters, for example, are used as filter elements, wherein bandblocks or edge filters can also be provided. Due to the positioning of the filter elements, only those spectral portions of the first and second light components interfere at certain positions of the detection unit (for example pixels) which spectral portions can pass the respective filter element.

For example, the filter elements are arranged in sub-apertures along the light path of the first light component and/or the second light component, wherein the spectral signatures of filter elements of at least two sub-apertures differ from each other.

In practice, it may prove sufficient if, for example, three wavelengths or wavelength ranges are used for wavelength-dependent illumination. In a corresponding manner, filter elements with three mutually different spectral signatures can be provided, for example. In both cases, for example, it is possible to create RGB (red/green/blue) images.

Filter elements are arranged, for example, within a light path in front of a respective reflection element.

The light source of the illumination unit may be or comprise, for example, a laser light source.

The light source of the illumination unit may be or comprise, for example, a broadband light source.

It may be envisaged that (2D) full-area illumination of the examination object is possible via the illumination unit, reference being made to the above explanations regarding the scatter spot.

Alternatively or additionally, it may be provided that partial illumination of the examination object is possible via the illumination unit.

Illumination light or excitation light can be focused, for example, on at least one point focus or one line focus, wherein an extended scatter spot is preferably formed, respectively.

In a preferred embodiment of the invention, the examination object may be illuminated by the illumination unit with a 2D point focus pattern. The point focus pattern comprises a certain spatial extension, for example, due to scattering at the examination object. Preferably, the point focus pattern is regular.

"Point focus" and/or "line focus" in the present case does not necessarily mean that a geometric point-shaped focus or a geometric line-shaped focus, respectively, is present. In particular, for example, an extended point focus or an extended line focus may take place. For simplicity, the terms "point focus" and "line focus" are used hereinafter.

It may be provided that illumination of the examination object takes place via the illumination unit, but the radiation emitted by the examination object comprises a different wavelength than the irradiated light and only this radiation with a different wavelength is measured, for example in Raman spectroscopy or fluorescence spectroscopy.

In deviation from the foregoing, it may be provided that no illumination of the examination object takes place, even if the device comprises an illumination unit. For example, illumination may be omitted for examination objects that are self-illuminating.

The device preferably comprises, upstream of the at least one beam splitter element with respect to the direction of incidence, a convex lens or concave mirror for collecting object light starting from the examination object. For a point focus, for example, a spherical lens is used. In a line focus, the lens may be a cylindrical lens, for example, although a combination with a spherical lens is also possible. Alternatively, for example in a line of adjacent individual foci, a one-dimensional lens array with spherical lenses may be provided.

The device includes, for example, at least one blocking element upstream of the at least one beam splitting element with respect to the direction of incidence for filtering or reflecting object light outside a predetermined spectral range. For example, a VPH capable of suppressing several orders of magnitude of unwanted spectral regions is used as the blocking element.

Preferably, the device may be free of moving mechanical elements. This favors a compact design and reliable operation of the device.

BRIEF DESCRIPTION OF THE DRAWINGS

The following description of preferred embodiments of the invention, in the context of the drawing, serves to explain the invention in more detail. It shows:

FIG. 2 and FIG. 3: schematic representations of reflection elements of the device of FIG. 1 in the direction of view of the arrows "2" and "3", respectively, in FIG. 1;

FIG. 4: a further preferred embodiment of the device according to the invention in schematic representation;

FIG. 8: a schematic representation of a further preferred embodiment of the device according to the invention;

FIG. 9: an enlarged detail representation of detail C in FIG. 8; and

FIG. 10: a schematic representation of a further preferred embodiment of the device according to the invention.

DETAILED DESCRIPTION

Figure 1:
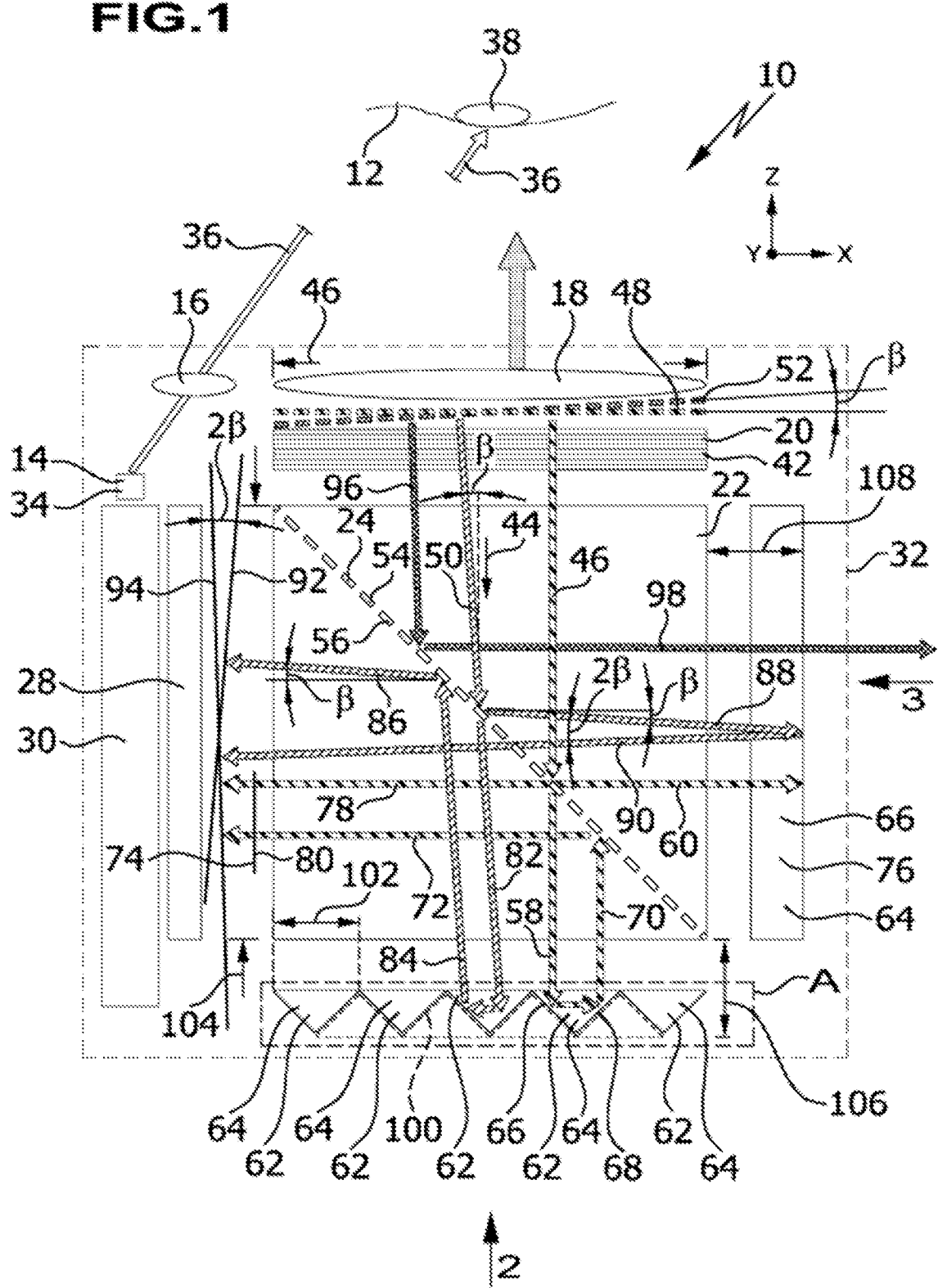
FIG. 1: A first preferred embodiment of the imaging device according to the invention in schematic representation.

In the following, various preferred embodiments of the imaging device according to the invention are discussed with reference to the respective figure. First, with reference to FIGS. 1 to 3, a first preferred embodiment is explained, which is assigned the reference character 10. Reference is then made to further preferred embodiments. Identical reference signs are used for features and members that are the same or have the same effect. Only the essential differences with respect to the first-mentioned advantageous embodiment are mentioned with respect to the further advantageous embodiments. The advantages achievable in conjunction with this embodiment can also be achieved in the further embodiments, even if this is not explained in detail.

FIG. 1 shows an application of the device 10 in the examination of an examination object 12, which may be, for example, a mechanical or living object.

Overall, however, the device 10 proves advantageous for application in apparatuses with which the examination object 12 is spatially scanned while the device 10 is in motion and meanwhile remains stationary, for example.

The device 10 comprises an illumination unit 14, at least one focusing lens 16, at least one convex lens 18, a blocking element 20, a beam splitter cube 22 with beam splitter layer 24, reflection elements 62, a detection unit 28 and an evaluation unit 30. Here, in particular the lenses 16, 18, the blocking element 20 and the concrete embodiment of the beam splitter cube 22 are optional.

The device 10 may comprise a casing 32, schematically indicated in FIG. 1, in which its components are arranged. It may be provided that individual components of the preceding may be arranged outside of the housing 32.

For example, the evaluation unit 30 is arranged outside the casing 32. The evaluation unit 30 is coupled to the detection unit 28 and particularly to the illumination unit 14. Here, a wired and/or a wireless coupling may be provided.

Bei der beispielhaften Anwendung der Vorrichtung 10 emittiert eine Lichtquelle 34 der Beleuchtungseinheit 14 Beleuchtungslicht 36. Die Lichtquelle 34 ist zum Beispiel eine Laserlichtquelle.

For example, the evaluation unit 30 is arranged outside the casing 32. The evaluation unit 30 is coupled to the detection unit 28 and particularly to the illumination unit 14. Here, a wired and/or a wireless coupling may be provided.

In the exemplary application of the device 10, a light source 34 of the illumination unit 14 emits illumination light 36. For example, the light source 34 is a laser light source.

The illumination unit 14 may be configured for narrowband and/or broadband illumination. Conceivably, focused illumination and/or full-area illumination of the examination object 12 may be provided. In some applications, full-area illumination may be provided. Full-area illumination may be provided, for example, in the case of an extended large scatter spot.

In a different type of application, provision may be made for the examination object 12 to be self-illuminating and therefore to remain unilluminated. An exemplary application is in the region of laser welding, wherein the examination object 12 is located in the region of a joint of workpieces to be joined together.

In the present example, the illumination light 36 is focused on the examination object 12 via the focusing lens 16 and illuminates the examination object 12 in the region of a focal point. The illumination takes place over a spread-out scatter spot 38. In the present application, a diameter of the scatter spot 38 is typically much greater than about 100 μm, for example, about 1 mm to 5 mm.

The focus may be, for example, a point focus or a line focus. Preferably, illumination may take place using a 2D point focus pattern, which is preferably regular. Alternatively, for example, 2D full-area illumination is used, as mentioned.

The convex lens 18 may be a spherically curved lens or a cylindrical lens. In the latter case, a one-dimensional lens array with spherical lenses may alternatively be used. The lenses are, for example, microlenses arranged side by side perpendicular to the drawing plane (Y-direction) in the present example. In a respective manner, the cylindrical lens may be extended perpendicular to the drawing plane.

Object light emanating from the examination object 12 may be incident into an input aperture 40 of the device 10. The input aperture 40 is defined herein by the convex lens 18. Object light of undesired spectral regions may be blocked by the blocking element 20. For this purpose, the blocking element 20 is designed, for example, as a VPH 42.

It is particularly envisaged that the examination object 12 is positioned in the focal plane of the convex lens 18. Incident object light thus comprises an essentially planar wavefront after passing through the convex lens 18. As explained at the beginning, contributions incident with a curved wavefront can be assigned to planes outside the focal plane by calculation.

The device 10 comprises a defined direction of arrival 44. The Direction of arrival 44 is defined, for example, by the optical axis of the converging lens 18.

Hereinafter, the term "beam" will also be used with respect to the object light, although the wave nature of the object light is essential to the operation of the device 10. The use of the term "beam" is merely for ease of description of the invention in the context of the drawing.

Object light incident in the defined direction of arrival 44 is indicated in FIG. 1 by reference numeral 46. This object light 46 comprises a wavefront 48. Object light 46 originates from the region of geometric focus of the scatter spot 38.

In contrast, object light identified by reference character 50 in FIG. 1 may comprise an angle β relative to the direction of arrival 44. This object light 50 originates from regions of the scatter spot 38 that are located outside the geometric focus. The object light 50 comprises a wavefront 52. The wavefront 52 is also inclined relative to the wavefront 48 by an angle β.

The angle β is indicative of the region of the scatter spot 38 from which object light originates. This region can be determined by multiplying the angle by the focal length of the converging lens 18. Accordingly, an image of the examination object 12 can be formed at least in the region of the scatter spot 38. The contributions of object light from different regions incident at different angles β are added together.

Computationally, this can be implemented in particular by the interference fringes, which are proportional in frequency to β, adding up on the detector and being combined by frequency analysis (Fourier transformation) by the evaluation unit 30 to form a coherent image.

By spatially scanning the examination object 12, a coherent image can be formed as a whole.

It is understood that object light as a whole is incident from the scatter spot 38 into the input aperture 40. The object light 46 and the object light 50 represent a respective portion of the total incident object light.

First, the light path of the object light 46 incident in the direction of arrival 44 is discussed.

For incident object light, the beam splitter layer 24 forms a beam splitter element 54. For outgoing object light reflected in the direction of the detection unit 28, the beam splitter layer 24 forms the aforementioned optical element 56.

The object light 50 is split by the beam splitter element 54 into a first light component and a second light component. Preferably, this takes place in halves, respectively. In the present example, the first light component (beam 58) is transmitted by the beam splitter element 54. The second light component (beam 60) is reflected by the beam splitter element 54 in the present example.

The device 10 is arranged such that object light 46 in the defined direction of arrival 44 transmits the first light component without deflection and the second light component is reflected by 90° relative to the direction of arrival 44.

In the light path of the first light component, the device 10 comprises at least one reflection element 62. Presently, a plurality of reflection elements 62 are provided, configured as inverted prisms and particularly as roof prisms 64. The roof prisms 64 are arranged laterally adjacent to each other in a first spatial direction (presently X). In a respective further spatial direction (present Y) the roof prisms 64 comprise a longitudinal extension (FIG. 2).

In the present case, the roof prisms 64 are identically configured.

A respective roof prism 64 comprises two sides 66, 68 arranged at an angle to each other. The angle between the sides 66, 68 is presently 90°. In particular, the roof prisms 64 are formed isosceles-rectangular in cross-section. Here, the hypotenuse faces the beam splitter layer 24. The sides 66, 68 are formed by the respective cathets.

At the respective sides 66, 68, the first light component is reflected and reflected back parallel to the beam 58 (beam 70). The first light component falls on the beam splitter layer 24 acting as optical element 56 and is reflected in the direction of the detection unit 28 (beam 72).

As a result of the reflection elements 62 and the subsequent reflection from the beam splitter layer 24, the wavefront 74 of the first light component is inverted with respect to the wavefront of the second light component in a spatial direction.

The second light component is reflected according to the beam 60 in the direction of reflection elements 76. The reflection elements 76 are in the present case also roof prisms 64, which are preferably configured identically to the roof prisms 64 in the light path of the first light component. Reference is made to the above explanations.

However, the roof prisms 64 in the light path of the second light component are arranged rotated by 90° with respect to their orientation relative to the roof prisms 64 in the light path of the first light component (FIG. 3). Accordingly, these roof prisms 64 comprise a longitudinal extension in the Z direction. In the Y-direction, they are arranged side by side.

As a result, the roof prisms 64 in the light path of the second light component in the X-Z plane (FIG. 1) act only as mirrors. The roof prisms 64 in the light path of the first light component act only as mirrors in the Y-Z plane.

The beam 60 is therefore reflected (in the X-Z plane) by the roof prisms 64 acting as mirrors and transmitted through the beam splitter layer 24 (beam 78). In the present case, a wavefront 80 of the second light component coincides with the wavefront 74 of the first light component.

In the case of the first light component, the inversion of the wavefront 74 takes place in a spatial direction along the X-direction. In contrast, the inversion of the wavefront 80 in the second light component takes place in a spatial direction along the Y direction.

In the case of interfering wavefronts of both light components, this allows an interference pattern to be formed in two spatial directions in the Y-Z plane of the detection unit 28, which can have a chessboard-like configuration, so to speak.

In the present example of the coincident wavefronts 74, 80, these may interfere, but in the evaluation unit 30 they contribute only to a constant signal which can be disregarded in the evaluation.

The situation is different in the case of object light that is incident in a Direction of Arrival 44 that deviates from the direction of arrival. This is explained using the object light 50 as an example.

The object light 50 is split into the first light component and the second light component at the beam splitting layer 24.

The first light component (beam 82) is reflected in parallel by the roof prisms 64 of the first light path (beam 84) and then reflected at an angle β relative to the X direction at the beam splitter layer 24 in the direction of the detection unit 28 (beam 86).

In contrast, the second light component is reflected at an angle β relative to the X direction in the direction of the roof prisms 64 of the second light path (beam 88). In the X-Z plane, the roof prisms 64 act as mirrors as mentioned, so that the second light component is again reflected at the angle β in the direction of the detection unit 28 according to the law of reflection (beam 90). With respect to the beam 88, the beam 90 therefore comprises an angle 2β. In a respective manner, the angle between the beams 86 of the first light component and 90 of the second light component is 2β.

Wave fronts 92 of the first light component and 94 of the second light component incident on the detection unit 28 are inclined relative to each other by the angle 2β.

When the light components self-interfere, an interference pattern is formed between the wavefronts 92, 94 due to the inclination angle 2β. The interference pattern is in turn indicative of the angle β that the object light 50 comprises with respect to the defined direction of arrival 44. Accordingly, the interference pattern is indicative of the point of origin of this portion of the object light in the region of the scatter spot 38.

The evaluation unit 30 may determine, for example by Fourier transform methods, the angle β based on the analysis of the interference pattern, determine the origin of the object light 50 from the scatter spot 38, and thereby generate an image of the examination object 12.

The evaluation unit 30 may determine, for example by Fourier transform methods, the angle β based on the analysis of the interference pattern, determine the origin of the object light 50 from the scatter spot 38, and thereby generate an image of the examination object 12.

In the present case, the 2D interference pattern can generate a 2D image of the examination object.

In the device 10, it may be provided that the illumination unit 14 is configured to emit light of different wavelengths. For example, light of different wavelengths may be emitted sequentially in time. Here, for example, several spectral regions, which may be separated from each other, are conceivable.

For example, three spectral regions in the sense of RGB imaging can be provided.

The evaluation unit 30 is synchronized with the illumination unit 14, for example, and can generate different images of the examination object 12 depending on the respective wavelength. The images can subsequently be combined to form an overall image with three color channels.

It may be advantageous if light outside of desired spectral ranges can be coupled out via the device 10. This is exemplified by a beam 96 that is reflected at the beam splitter layer 24 (beam 98), wherein transmission is also conceivable. The beam 98 can be coupled out via the roof prisms 64 of the second light path. The roof prisms 64 may be provided with a dielectric coating for this purpose. It may be provided that counter prisms are optically coupled to the roof prisms 64. In this case, an adjustment of the refractive index (index matching) is provided in the region of the joint. FIG. 1 shows with a dashed line 100 respective counter prisms in the region of the first light path by way of example. It is understood that such counterprisms can be arranged in both light paths.

It is further apparent from FIGS. 1 to 3 that a respective reflection element 62, 76 forms a sub-aperture 102. The sub-apertures 102 preferably correspond in their entirety to a respective total aperture 104 of the detection unit 28. FIG. 1 depicts this in the X-Z plane for the first light path. In the Y-Z plane (FIG. 3), the sub-aperture 102 of the reflection elements 76 preferably also corresponds in its entirety to the total aperture of the detection unit 28.

The device 10 is designed such that the entirety of the sub-apertures 102 in the X-direction or the Y-direction also corresponds to the input aperture 40.

In the present embodiment, the sub-aperture 102 is defined by the extent of the roof prisms 64 along the hypotenuse.

The use of a plurality of reflection elements 62 and particularly roof prisms 64 with sub-aperture 102 proves to be advantageous for the quality of the interference pattern during self-interference. For this purpose, it is advantageous to use sufficiently small sub-apertures 102. With these, the respective interference patterns form better than with a large (sub)aperture because, for a given angle β, the smaller the sub-aperture 102 itself, the smaller the path differences at the edges of the respective sub-aperture 102. The more the spectrum of the radiation deviates from a purely monochromatic radiation, the more the signal at the edges of the sub-aperture 102 decreases.

The improved interference pattern resulting from the sub-apertures 102 gives the advantage of high signal strength over the entire detection aperture 104, and the signal contributions from the individual sub-apertures 102 can be added together to produce an image with a good signal-to-noise ratio. By utilizing the amplitude and phase information of the individual sub-aperture signals, a higher resolution image can be produced as mentioned.

The device 10 allows high spatial resolution while maintaining a compact design. Due to the respective inversion of a wavefront 92, 94 of one light component with respect to the wavefront 94, 92 of the respective other light component in the reflection, the inclination angle 2β between the interfering wavefronts 92, 94 is twice as large as the angular deviation β with respect to the defined direction of arrival 44. The use of reflection elements 62, 76 keeps the design of the device 10 compact. For example, dimensions of approximately 10 mm or less each, for example 5 mm or less, in the X/Y/Z direction can be achieved. Such dimensions are advantageous, for example, for endoscopic applications or in devices with limited installation space, such as smartphones or tablet computers.

It may be provided that the path length of the first and the second light component from the beam splitter layer 24 to the respective reflection elements 62, 76 and back is the same in both light paths.

On the other hand, it may be provided that path lengths of different lengths are used selectively. In FIG. 1, this is shown, for example, via the lengths 106 and 108 in the first and second light paths, respectively, for the positioning of the respective reflection elements 62.

In differential measurements where an excitation wavelength of excitation light of the illumination unit 14 is slightly changed in successive measurements, a phase difference of interference patterns of approximately 180° (Pi) can be generated via the path length difference between the lengths 106 and 108, for example. The evaluation unit 30, which is synchronized with the illumination unit 14, can subtract the images determined during the respective measurement from each other. During the subtraction, contributions from incoherent and/or broadband radiation, which remain essentially unchanged due to the shift in excitation wavelength, can be largely reduced or ideally eliminated in this way.

In the device 10 according to FIG. 1, reflection elements 62, 76 in the form of retroreflector elements are used in both light paths.

In the embodiment of the invention shown in FIG. 4 and identified by the reference sign 110, retroreflector elements are arranged only in the first light path for the first light component. In contrast, a reflection element 76 in the form of a mirror 112 is arranged in the second light path for the second light component.

The reflection elements 62 in the first light path comprise lenses 114 and concave mirrors 116 associated therewith. The lenses 114 are, for example, microlenses that can be spherical in shape. The concave mirrors 116 are, for example, spherical concave mirrors.

It is understood that a matrix-like arrangement of lenses 114 and concave mirrors 116 may be provided in the X-Y plane extending perpendicular to the drawing plane.

The use of sub-apertures 102, each defined by the lenses 114 and concave mirror 116, enables a compact design of the device 110. An application of only one aperture is conceivable, but, in deviation from the illustration shown in FIG. 4, requires a relatively large lens 114 over the total aperture 40 or 104. In a corresponding manner, the concave mirror 116 would have to be formed with a respective size and positioned at a suitable distance from the lens 114.

Sub-apertures 102 are formed in the device 110 by the application of the lenses 114 in the X-direction and in the Y-direction.

In the device 110, the first light component undergoes wavefront inversion in two spatial directions via the lens 114. In contrast, no wavefront inversion takes place for the second light component due to the use of the mirror 112.

In the device 110, the color imaging explained in the example of the device 10 can also be provided, wherein spatially resolved images with different colors are created by the evaluation unit 30 and can be superimposed, for example.

The mirror 112 may be a plane mirror as shown in FIG. 4. Alternatively, a preferably spherical concave mirror 118 may be provided, shown with dashed line. This proves advantageous, for example, to prevent object light incident at large angles β from being reflected away to the outside.

Figure 5:
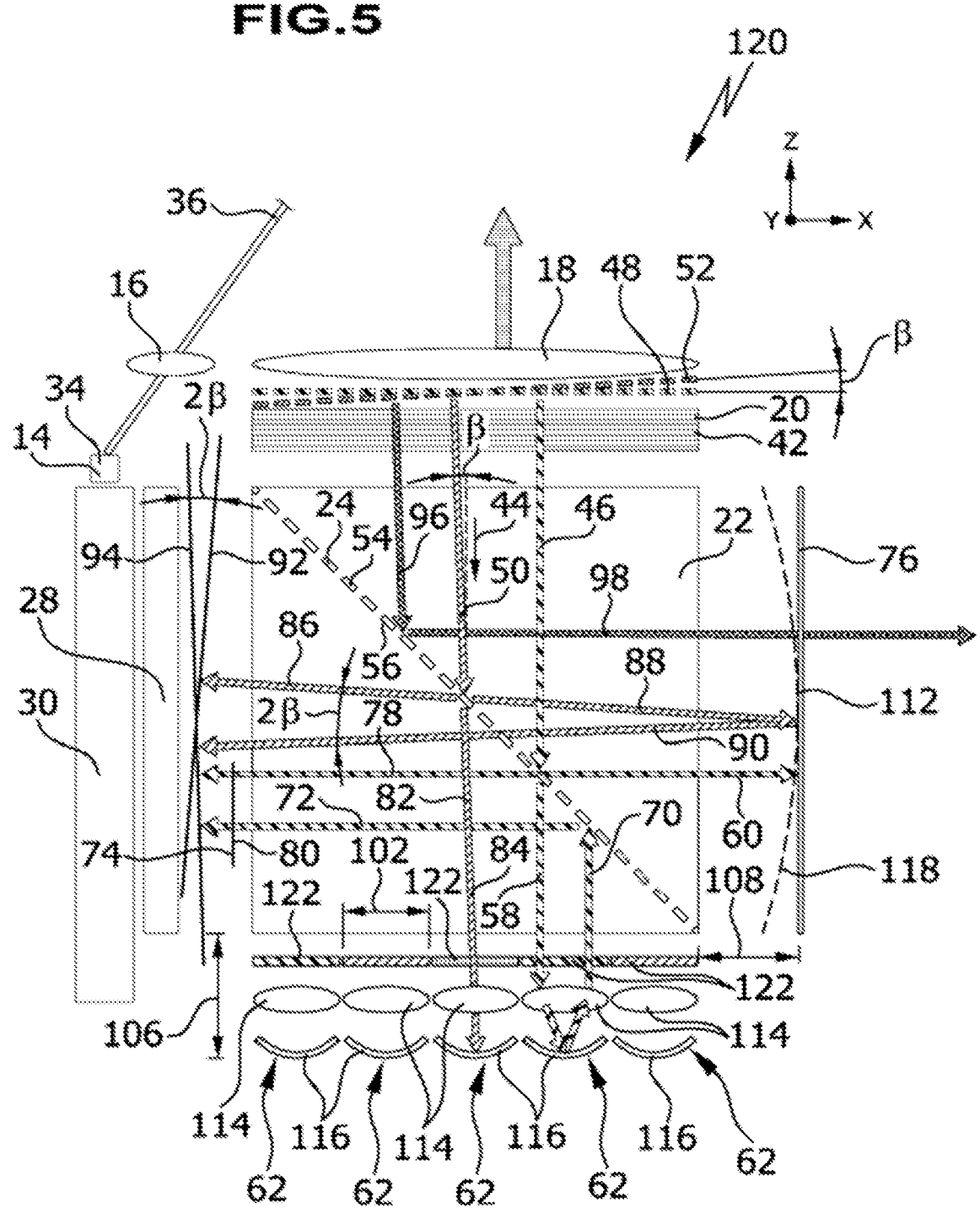
FIG. 5: a further preferred embodiment of the device according to the invention in schematic representation.

FIG. 5 shows a device according to the invention in a preferred embodiment, assigned the reference character 120. The device 120 differs from the device 110 in that filter elements 122 of different spectral signatures are used. For example, filter elements 122 with three different spectral signatures are used. In particular, this may involve bandpass filters that allow three wavelength ranges to pass that are separate from one another. Conceivable here, for example, is an RGB signature (red/green/blue), as explained in the example of device 10.

The device 110 is used, for example, in the examination of a self-luminous examination object 12. Here, for example, the illumination unit 14 may be omitted or left unused.

The filter elements 122 may be arranged in the light path of the first light component and/or in the light path of the second light component. In the present case, the filter elements 122 are positioned upstream of the lenses 114.

For example, the sub-apertures 102 comprise filter elements 122 having different signatures from each other.

In the device 110, only those portions of the first light component that are capable of interfering with light of the second light component due to spectral selection by the respective filter element 122 spatially selectively interfere at the detection unit 28. Other contributions can be disregarded by the evaluation unit 30 during the evaluation.

It is understood that such filter elements 122 may also be provided in embodiments 10 and 110. In a respective manner, it may also be provided in the device 120 that the illumination unit 14 may emit light of different wavelengths.

Figure 6:
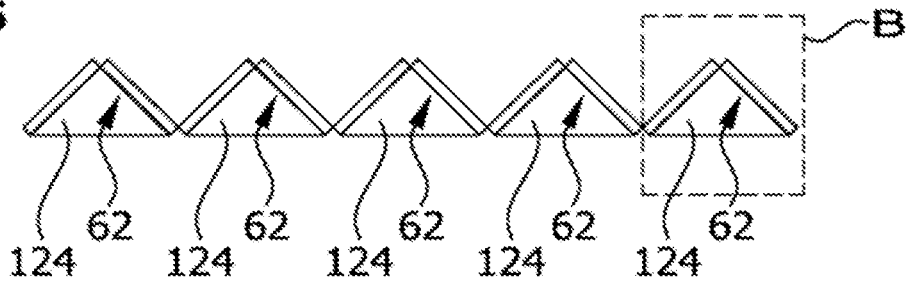
FIG. 6: an enlarged representation in the region of detail A in FIG. 1 in a further preferred embodiment of the device according to the invention.
Figure 7:
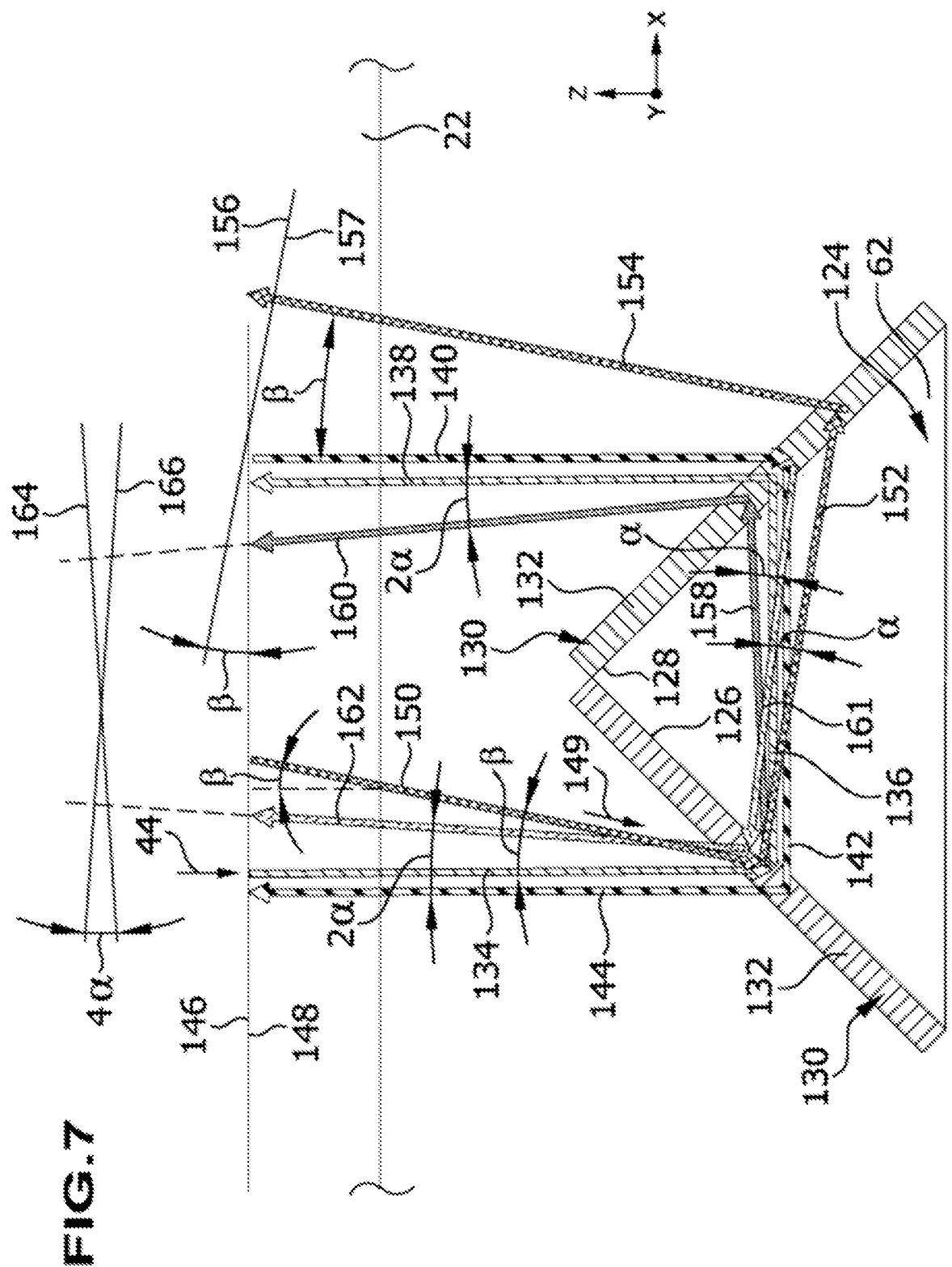
FIG. 7: an enlarged representation of detail B in FIG. 6, wherein light rays are drawn.

In a further preferred embodiment of the invention, which is not shown in detail in the drawing, reflection elements 62 are used, which are shown schematically in FIG. 6. These reflection elements 62 replace, for example, the roof prisms 64 in FIG. 1 or the lenses 114 and concave mirrors 116 in FIGS. 4 and 5. FIG. 7 shows a reflection element 62 in detail with different beam patterns of one of the light components, for example the first light component.

In the present example, the reflection elements 62 according to FIG. 6 and FIG. 7 are also inverted prisms and, in particular, roof prisms 124. The roof prisms 124 are preferably isosceles-rectangular in shape with sides 126, 128 arranged at an angle of 90° to each other.

However, in the present case, the roof prisms 124 are arranged such that the sides 126, 128 face the incident first or second light component. Accordingly, the cathets face the object light and the beam splitter layer 24. The same applies to the "edge" of the roof prism 124. The hypotenuse faces away from the incident object light and the beam splitter layer 24 (FIG. 7).

The roof prisms 124 may comprise a longitudinal extension in the Y direction in the light path of the first light component, in particular like the roof prisms 64. In the light path of the second light component, the roof prisms 124 may also be arranged and form the reflection elements 76 there.

As explained with reference to the example of the device 10, these roof edge prisms 124 are arranged and aligned rotated by 90° relative to the roof edge prisms in the light path of the first light component.

Otherwise, it can be provided that reflection elements 76 in the form of the roof prisms 64 as explained with reference to FIG. 1 or a reflection element 76 in the form of a mirror (FIG. 4 and FIG. 5) are applied in the respective other light path of the first or the second light component.

A diffraction element 130 is arranged at a respective side 126, 128 on the incidence side. The diffraction elements 130 are preferably identically formed and are configured, for example, as VPH 132.

Via the roof prisms 124 with VPH 132, in particular a spectroscopic imaging device according to the invention can be provided, in which a spectral resolution is possible in addition to the spatial resolution.

In this regard, the roof prisms 124 are arranged such that, with respect to object light incident in the defined direction of arrival 44, the VPH 132 adopts a Littrow arrangement. For example, FIG. 7 shows on the left in the drawing the incident beam 134 diffracted to the first order (beam 136) and deflected 90° with respect to the direction of arrival. The respective action takes place at the VPH 132 on the right in the drawing when diffracted to the first order (beam 138). Due to the double deflection by 90°, the roof prism 124 acts here as a reflection element, especially as a retroreflector.

The beams 140, 142 and 144 represent a corresponding state of facts, wherein a beam 140 incident on the VPH 132 on the right in the drawing is considered here as an example.

Here, the VPH 132 is assumed to comprise a predetermined wavelength, respectively. In this case, the wavefronts 146, 148 are located on top of each other, since the object light 46 is incident in the direction of arrival 44.

If object light 50 is incident with a direction of incidence 149 inclined by angle $\beta$ with respect to the direction of arrival 44, the roof prism 124 also acts as a reflection element (beams 150, 152, 154), specifically as a retroreflector, at the predetermined wavelength. The angle $\beta$ between the wavefront 156 and the superimposed wavefronts 146, 148 remains after reflection at the roof prism 124.

In the two preceding cases, the Bragg condition for the VPHs 132 applies to the object light 46, 50 of the incident beams 134, 140, 150, respectively.

It is understood that the Bragg condition is also satisfied when the beam path of object light 50 is reversed according to beams 154, 152, 150. In this case, the wavefront 157 coinciding with the wavefront 156 is also inclined by the angle $\beta$ with respect to the wavefronts 146, 148.

It may be provided that object light is incident at a wavelength different from the predetermined wavelength. This is shown schematically in FIG. 7, wherein it is now assumed that the beam designated by the reference sign 134 comprises the deviating wavelength and is incident in the direction of arrival 44. Diffraction at the VPH 132 on the left in the drawing results in an angle $\alpha$ relative to the beam 136 when diffracted to the first order (beam 158). Diffraction at the VPH 132 on the right in the drawing again results in an angular difference of a, so that the incident beam 160 comprises an angular difference of 2a with respect to beam 138.

Assuming that the beam designated by reference 140 comprises the deviating wavelength, the first diffraction relative to beam 142 results in a difference angle of $\alpha$(beam 161) and the diffraction at the further VPH 132 results in the same difference angle of $\alpha$. As a result, the outgoing beam 162 comprises the difference angle 2$\alpha$ relative to beam 144, but with the opposite sign as in the previous example. Between the wavefront 164 of the beam 160 and the wavefront 166 of the beam 162, this results in a tilt angle of 4$\alpha$.

Each of the wavefronts 164 and 166 interferes at the detection unit 28 with a corresponding wavefront of the other light component to form an interference pattern, and is tilted relative to that light component by a tilt angle 2$\alpha$. On the basis of the respective interference pattern, the evaluation unit 30 can determine the deviating wavelength and, in particular, generate a spectrum of the object light. By respectively diffracting the object light twice at both VPHs 132, a high spectral resolution can be achieved.

Independent of this, the evaluation unit 30 can determine the spatial components via the inclination of the wavefronts relative to one another, as explained above.

The spatial components of the object light and its spectroscopic components may overlap. For the segment shown in FIG. 7 on the left, the total angle at the tilt of the wavefront is 2$\beta$+2$\alpha$, and for the segment shown in FIG. 7 on the right, the total angle is 2$\beta$−2$\alpha$.

By difference formation of the Fourier transformed fringe patterns, the spectroscopic component with the difference angle 4$\alpha$ can be determined very precisely in this way. This can be implemented, for example, if the scatter spot 38 is sufficiently small and/or scatter spots 38 comprise a sufficient distance from each other and/or if the contributions of different wavelengths are separable from each other.

Spatial (lateral) and spectral information may be superimposed, for example, in the case of full-area illumination. In this case, it may be envisaged, for example, to change the wavelength of illumination light or excitation light of the illumination unit 14 in a controlled manner (wavelength sweep or the like).

In this case, different path lengths at the roof prism 124 with the VPHs 132 result for the spatial components with angle 2$\beta$ and the spectroscopic components with angle 2$\alpha$. The related interference patterns will behave differently with respect to the phases because of this, which can be taken into account by the evaluation unit 30 to separate overlapping spatial and spectral components.

FIG. 8 shows a preferred embodiment of the device according to the invention assigned the reference character 170.

In the device 170, a wavefront inversion unit 172 is used for inversion of the wavefront in the different light components. In particular, a plurality of wavefront inversion units 172, each defining a sub-aperture 102, are provided. The wavefront inversion units 172 as a whole comprise an aperture corresponding to the detection aperture 104.

The wavefront inversion units 172 are positioned upstream of the detection unit 28 in the Direction of arrival of the object light, and are respectively arranged side by side. For example, the wavefront inversion units 172 are identically configured. In the following, only the embodiment of a wavefront inversion unit 172 will be discussed, explained with reference to FIG. 9.

The wavefront inversion unit 172 comprises the beam splitter element 174 on the input side and the optical element 176 on the output side. The elements 174, 176 are configured, for example, as VPH or GPH. Here, object light can respectively be partially transmitted and partially diffracted. Preferably, respectively about 50% of the object light is transmitted by the elements 174, 176 and the remaining 50% is diffracted.

FIG. 9 shows the case in which object light 50 is inclined by angle $\beta$ relative to the direction of arrival 44. Further, two superimposed wavefronts 178, 180 are shown as part of this object light 50. These are respectively inclined by the angle β relative to a wavefront comprising object light 46 (not shown) incident in the direction of arrival 44.

Of the wavefronts 178, 180, one half is transmitted at the beam splitter element 174 in an undiffracted manner, respectively, and the other half is diffracted. The respective beams are shown with reference signs 182 and 184 and 185, respectively.

The optical element 176 and the beam splitter element 174 comprise a common focus that is located essentially centrally in the extension 187 of the wavefront inversion unit 172.

The optical element 176 transmits the beams 182 undiffracted. In contrast, the beams 184, 185 are also diffracted at the optical element 176.

On the output side of the wavefront inversion unit 172, there is a wavefront 178 due to the undiffracted beams 182 and a wavefront 180 due to the diffracted beams 184, 185. Due to the double diffraction at the elements 172, 176, the inclination angle between the wavefronts 178, 180 is 2β.

The wavefronts 178, 180 can interfere to form the interference pattern already mentioned. Reference may be made to the above discussion with respect to evaluation. In the device 170, for example, illumination light may be irradiated successively in time with different wavelengths, wherein the evaluation unit 30 is synchronized with the illumination unit 14 to form an image of the examination object depending on illumination light of different wavelengths, respectively. The images can be superimposed by the evaluation unit 30.

FIG. 10 shows in an embodiment an overall advantageous embodiment of the device according to the invention, designated by the reference sign 190. In the present case, the device 190 is similar in design to the device 110 according to FIG. 4, but differs from this device 110 in the nature and mode of action of the beam splitter element 54. In all other respects, reference is made to the above explanations.

Preferably, in the device 190, illumination light in wavelengths or wavelength ranges different from each other can be irradiated via the illumination unit 14.

In the device 190, a diffraction element 192 is used as the beam splitting element 54 which is also the optical element 56. The diffraction element 192 is configured as a spectral grating, in particular as a VPH 194. The diffraction element 192 is used for spectral splitting of the object light.

With the VPH 194, the object light can be transmitted or diffracted. In this way, the object light is split into a first light component and a second light component.

Here, the VPH 194 is positioned at arrangement of 45° with respect to the defined direction of arrival 44. In each case, 50% or essentially 50% of the incident object light is transmitted or diffracted respectively.

First, this is explained with respect to object light 46 incident in the direction of arrival 44. A first light component (beam 58) is transmitted by the VPH 194, reflected at the reflection element 62 (beam 70), and then diffracted at the VPH 194 in the direction of the detection unit 28 (beam 72).

By diffracting the incident object light 46 to the first order at the VPH 194 (beam 160), the second light component is formed. The second light component is reflected at the reflection element 76 (beam 78).

As in the previous embodiments, the wavefronts 74 and 80 of the two light components are located on top of each other because the object light 46 is incident in the defined direction of arrival 44.

With the object light 50 incident at an angle β inclined with respect to the direction of arrival 44, the first light component (arrow 82) is transmitted, reflected at the reflection element 62 (arrow 84), and then diffracted to the first order by the VPH 194 (arrow 86).

The second light component is first diffracted at VPH 194 (arrow 88). According to the law of reflection, reflection takes place at the reflection element 76 such that the light subsequently transmitted from the VPH 194 (beam 90) comprises an angle 2β relative to the light of the first light component according to the beam 86.

Therefore, as in the previous embodiments, the wavefronts 92 and 94 are inclined relative to each other by the angle 2β, and the evaluation unit 30 can determine the origin of the object light 50 based on the interference pattern between the wavefronts 92, 94 to form an image of the examination object 12.

In the previous two examples, it was assumed that the object light according to the beams 46, 50 respectively satisfies the Bragg condition of the VPH 194, i.e., the object light comprises a predetermined (Bragg) wavelength.

However, if the wavelength deviates from the predetermined wavelength, the beam pattern of the light components is as follows:

It is assumed that the wavelength of the object light incident via beam 50 deviates from the predetermined wavelength by one offset wavelength. In this case, there is no difference for the initially transmitted light of the first light component (beams 82, 84) until diffraction at VPH 194. However, during diffraction, the first light component comprises an angle α (beam 196) with respect to the direction of diffraction with the predetermined wavelength according to beam 86.

For the second light component, the angle α between the beam 88 for diffraction of object light according to the predetermined wavelength and the diffracted light with the changed wavelength also occurs (beam 198). In the subsequent reflection at the reflection element 76, the second light component according to the beam 102 is reflected in the direction of the detection unit 28 and transmitted by the VPH 194.

Between the beams 196 and 200, the angle is thus 2β+2α. The respective wavefronts 202, 204 also comprise an inclination angle of 2β+2α relative to each other in front of the detection unit 28.

If the plane mirror 112 is applied as reflection element, the phase fronts of the second light component within the sub-apertures comprise no differences except for possible offset phases. Possible aberrations are not considered here. Wavelength-dependent aberrations can be used by the evaluation unit 30 for the evaluation if required.

It is advantageous if the concave mirror 118 is used as reflection element 76. Within the respective sub-aperture 102, different phase fronts and offset phases result between the first light component and the second light component due to the respective path differences resulting from different reflection angles at the concave mirror.

The evaluation unit 30 can computationally separate the spatial contributions of the object light from the spectral contributions of the object light via this dependence on the sub-apertures 102, and in this way determine both an image of the examination object 12 and the spectrum of the object light. The spatially resolved images preferably include the color information, determined based on the different wavelengths, so that spatially resolved color images of the examination object 12 can be produced.

REFERENCE SIGN LISTING

10 device
12 examination object 14 illumination unit
16 focusing lens
18 convex lens
20 blocking element
22 beam splitter cube
24 beam splitter layer
28 detection unit
30 evaluation unit
32 casing
34 light source
36 illumination light
38 scatter spot
40 input aperture
42 VPH
44 defined direction of arrival
46 object light
48 wavefront
50 object light
52 wavefront
54 beam splitter element
56 optical element
58, 60 beam
62 reflection element
64 roof prism
66, 68 side
70, 72 beam
74 wavefront
76 reflection element
78 beam
80 wavefront
82, 84, 86, 88, 90 beam
92, 94 wavefront
96, 98 beam
100 dotted line
102 sub-aperture
104 detection aperture
106, 108 length
110 fixture
112 mirror
114 lens
116 concave mirror
118 concave mirror
120 device
122 filter element
124 roof prism
126, 128 side
130 diffraction element
132 VPH
134, 136, 138, 140, 142, 144 beam
146, 148 wavefront
149 direction of arrival
150, 152, 154 beam
156 wavefront
157 wavefront
158, 160, 161, 162 beam
164, 166 wavefront
170 device
172 wavefront inversion unit
174 beam splitter element
176 optical element
178, 180 wavefront
182, 184, 185 beam
187 extension
190 device
192 diffraction element
194 VPH
196 beam
198 beam
200 beam
202 wavefront
204 wavefront
$\alpha$ angle
$\beta$ angle
$2\beta$ inclination angle

The invention claimed is:

1. An optical imaging device comprising at least one beam splitter element onto which object light emanating from an examination object is incident via an input aperture of the optical imaging device from an examination object and at which the object light is split into a first light component and a second light component which comprise a respective wavefront, wherein the optical imaging device is configured in a wavefront-inverting manner for inverting the respective wavefront of the first light component and/or the respective wavefront of the second light component, wherein the first light component and the second light component are incident via at least one optical element falling on a detection side of the optical imaging device, wherein the respective wavefront of the first light component and of the second light component interfere at the detection side of the optical imaging device depending on an inclination angle between the respective wavefront of the first and the second light component to form a respective interference pattern, which angle of inclination characterizes an angle which the object light comprises on the side of incidence with respect to a defined direction of arrival on the at least one beam splitter element.

2. The optical imaging device according to claim 1, wherein the angle of inclination between the respective wavefront of the first light component and the second light component is twice as large as the angle, such that the object light adopts an angle with respect to the defined direction of arrival on the at least one beam splitter element.

3. The optical imaging device according to claim 1, wherein the optical imaging device comprises or forms at least one sub-aperture, wherein the at least one sub-aperture is configured to invert a respective wavefront of the first light component and/or the respective wavefront of the second light component.

4. The optical imaging device according to claim 1, wherein the at least one beam splitter element forms the at least one optical element.

5. The optical imaging device according to claim 1, wherein the at least one beam splitter element is or comprises a diffraction element, and in that the first light component is transmitted by the diffraction element, after reflection at a reflection element is reflected and is diffracted at the diffraction element in the direction of the detection side of the optical imaging device in a wavelength-dependent manner and in that the second light component is diffracted at the diffraction element in a wavelength-dependent manner in the direction of a reflection element, from which it is reflected in the direction of the detection side of the optical imaging device and is transmitted by the diffraction element.

6. The optical imaging device according to claim 1, wherein the device the optical imaging device is a spectroscopic imaging device and comprises at least one element spectrally decomposing the object light, wherein a respective interference pattern at a given inclination angle of the respective wavefront of the first and the second light component is dependent on a wavelength of the object light.

7. The optical imaging device according to claim 1, wherein the optical imaging device comprises at least one first reflection element associated with the first light component, at which the first light component is reflected towards the at least one optical element, and/or at least one second reflection element, at which the second light component is reflected towards the at least one optical element.

8. The optical imaging device according to claim 7, wherein a plurality of reflection elements is provided, which are arranged side by side and which respectively form a sub-aperture for the first light component or the second light component.

9. The optical imaging device according to claim 7, wherein at least one of the following applies:
 the at least one first reflection element and/or the at least one second reflection element comprises or forms a retroreflection element;
 at least one reflection element is a plane mirror or a concave mirror.

10. The optical imaging device according to claim 7, wherein the at least one first and/or second reflection element comprises a lens and a mirror.

11. The optical imaging device according to claim 10, wherein an array of microlenses having a predetermined center thickness is provided, and their rear lens surfaces, with respect to the direction of arrival, are mirrored to form the mirror.

12. The optical imaging device according to claim 7, wherein at least one first reflection element and/or the at least one second reflection element comprises two sides oriented at an angle to one another, wherein the at least one reflection element is or comprises an inverted prism.

13. The optical imaging device according to claim 7, wherein in the light path of the first light component and in the light path of the second light component at least one reflection element is provided respectively, wherein the reflection elements are extended along respective spatial directions which are oriented at an angle to one another.

14. The optical imaging device according to claim 12, wherein the at least one reflection element is arranged such that the sides in the direction of arrival of the object light comprise a diffraction element, respectively, wherein incident object light is diffracted at the respective diffraction element in a wavelength-dependent manner, wherein object light of a predetermined wavelength is reflected back parallelly.

15. The optical imaging device according to claim 1, wherein the optical imaging device comprises, upstream of the at least one beam splitter element with respect to the direction of arrival, at least one of the following applies:
 a convex lens (18) or concave mirror for collecting object light starting from the examination object;
 at least one blocking element for filtering or reflecting object light outside a predetermined spectral range.

* * * * *